(Model.)
F. HUMMEL, Sr.
BREECH LOADING FIRE ARM.
No. 258,759.                     Patented May 30, 1882.
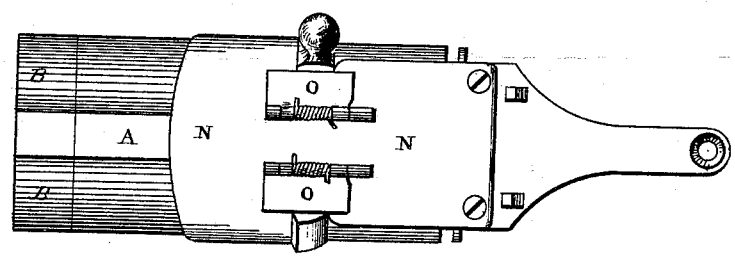
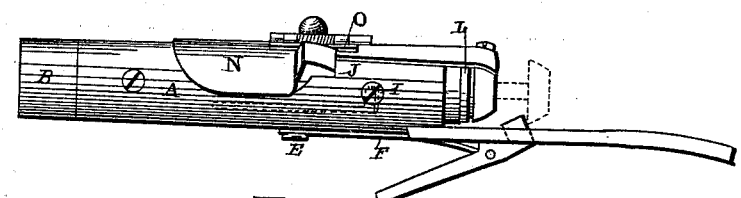
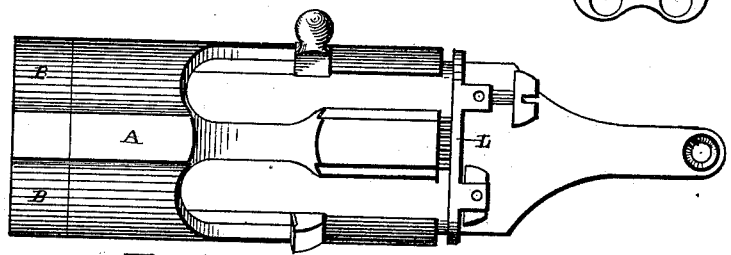
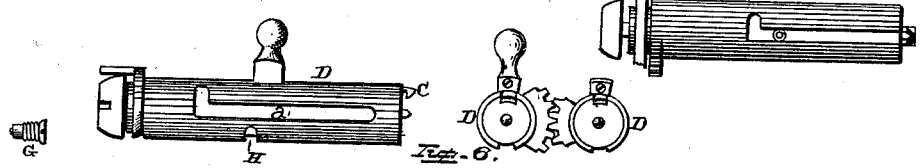
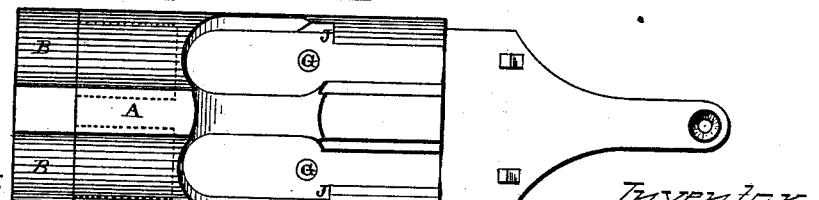
Witnesses:
W. W. Mortimer
A. C. Kuskadden
Inventor:
F. Hummel, Sr.
per
F. A. Lehmann,
Att'y.

UNITED STATES PATENT OFFICE.

FERDINAND HUMMEL, SR., OF PADUCAH, KENTUCKY.

BREECH-LOADING FIRE-ARM.

SPECIFICATION forming part of Letters Patent No. 258,759, dated May 30, 1882.

Application filed February 28, 1881. (Model.)

*To all whom it may concern:*

Be it known that I, FERDINAND HUMMEL, Sr., of Paducah, in the county of McCracken and State of Kentucky, have invented certain new and useful Improvements in Breech-Loading Guns and Cannons; and I do hereby declare the following to be a full, clear, and exact description of the invention, such as will enable others skilled in the art to which it pertains to make and use it, reference being had to the accompanying drawings, which form part of this specification.

My invention relates to an improvement in breech-loading guns and cannons of all kinds; and it consists in fastening the two bolts together at their rear ends by means of a plate, so that the two bolts will move together, and providing each bolt with a series of cogs, by means of which they will be caused to revolve in opposite directions.

It further consists in passing the ends of the screws which hold the two trigger-springs in position up through the bottom of the frame and providing the upper ends of these screws with rollers, so that when the bolts are drawn backward the rear ends of the cartridge-shells will strike the rollers and be thrown out of the frame.

It further consists in a shield for covering the rear cut-away portion of the frame and providing this shield with spring-wings, so that the handles or knobs upon the bolts can be turned upward.

It further consists in the arrangement and combination of parts, which will be more fully described hereinafter.

Figure 1 is a plan view of my invention. Fig. 2 is a side elevation of the same. Fig. 3 is a plan view of my invention with the shield removed. Figs. 4 and 5 are detached views of the two bolts. Fig. 6 is a plan view of the frame, and Fig. 7 is a side view of the same.

A represents the frame, and B the barrels. These barrels have their ends reduced in size and inserted in the front end of the frame and then secured in position by means of screws, solder, or any other suitable means. The rear ends of these barrels are cut away at their tops, so that the cartridge-extractors C in the tops of the bolts D can readily catch over the flanges of the cartridges. The rear end of the frame is cut away upon its top, as shown, and its rear end is wholly open, so that the two bolts can be freely moved back and forth in it. Secured to the under side of this frame by means of the screws E are the trigger-springs F, and the upper ends of these screws pass through the bottom of the frame and have rollers G secured to their upper ends. These rollers project a suitable distance above the bottom of the frame A in the direct travel of the two bolts, and serve the purpose of throwing the cartridge-shells out of the frame as the bolts are drawn backward. In the under side of each one of the bolts is made an L-shaped groove, H, and these grooves allow the bolts to pass over these roller-screws and to turn partially around. As the bolts are drawn backward the cartridge-extractors draw the shells back with them until the lower edge of the rear end of the shell strikes against the roller, when the continued backward movement of the bolts causes the shells to fly out of the frame.

In order to prevent the bolts from being drawn too far backward, in the outer side of each bolt is made an L-shaped groove, $a$, in which the roller-screw I catches, and which screw, while it allows the bolts to move freely back and forth and to turn partially around, prevents them from being withdrawn from the frame. Only one of the bolts is provided with a handle or lever for moving them, while the other one has simply a projection, which serves to catch behind the shoulder J on the frame, and thus lock the bolts securely in position. These two bolts are connected together at their rear ends by means of a perforated plate, L, and each one of the bolts, just inside of this plate, is provided with a series of cogs, by means of which the two bolts can be turned in opposite directions. Extending from each bolt is a firing-pin, such as is in general use, and which is made to catch, as the bolts are pushed forward, behind the pins of the triggers L, and remain in this position until the trigger is pulled for the purpose of firing off the gun.

In order to protect the bolts and the open part of the frame as much as possible, a shield, N, is screwed upon the top of the plate which unites the two bolts together, and this shield extends forward far enough to entirely cover not only all of the open part of the frame, but all of the two bolts, with the exception of the handle upon one and the projection upon the other. In order that the bolts may be turned inward toward each other for the purpose of freeing the handle and the projection from the shoulders on the frame, behind which they catch when the bolts are locked in position, this shield is cut away just over these two parts, and the cut-away parts are covered over by means of spring-wings O. As the two bolts are turned toward each other the handle and the projection raise these two hinged wings upward; but as soon as the bolts are turned outward the wings snap down into position. By means of this shield rain, dust, and dirt are prevented from getting into the moving parts of the gun and clogging their action, as they otherwise would do.

This construction, above described, is equally applicable to breech-loading rifles and shot-guns and to cannons of all kinds. Cannons with three or four barrels may be made, and which may be fired with great rapidity.

Having thus described my invention, I claim—

1. In a breech-loading gun, the combination of the frame, two endwise-moving bolts, stops for regulating the movements of the bolts, and a plate, L, for connecting the rear ends of the bolts loosely together, substantially as shown.

2. The combination of the frame A, two endwise-moving bolts, D, having the slots $a$ in their outer sides, and provided with teeth or cogs for causing them to turn in opposite directions, the plate L, for connecting the two bolts together, and the screws I, provided with friction-rolls, substantially as described.

3. The combination of the two bolts D, connected together at their rear ends by a plate, L, and a shield, N, the shield being attached to the plate and made to move with the bolts, substantially as set forth.

4. In a breech-loading fire-arm, the combination of the frame A, open upon its top, endwise-moving bolts provided with levers or projections, a connecting-plate, L, the shield N, connected to the plate, and provided with the spring-wings O, substantially as specified.

In testimony whereof I affix my signature in presence of two witnesses.

FERDINAND HUMMEL, Sr.

Witnesses:
HENRY MAMMEN,
A. F. EHMEN.